March 8, 1955 T. K. YOUNG 2,703,767
TRANSPARENT ELECTRICALLY CONDUCTING UNIT
Filed May 21, 1951
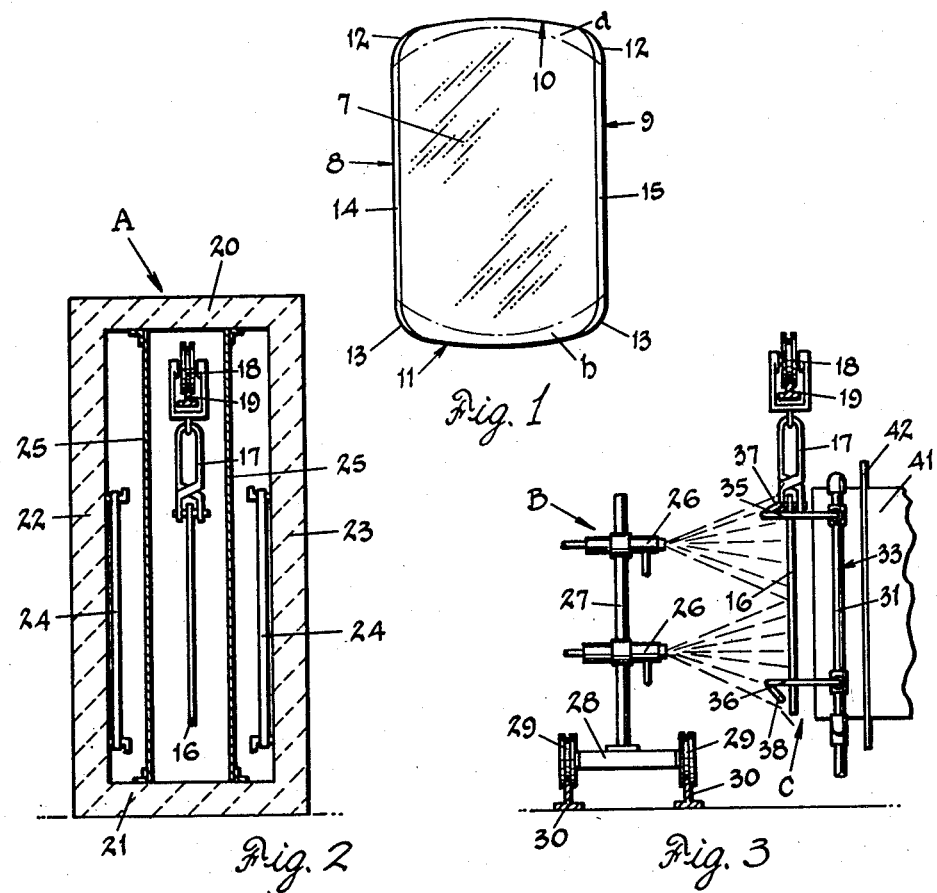
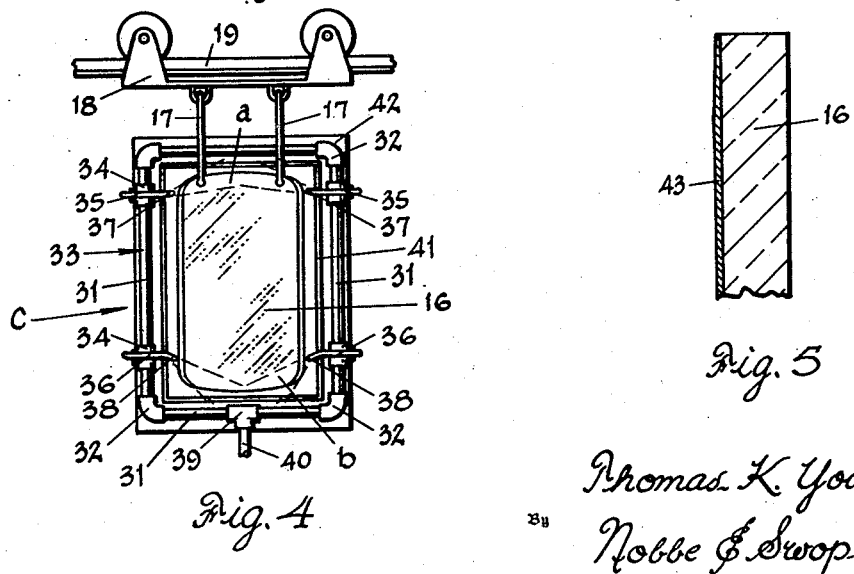
Inventor
Thomas K. Young
By Nobbe & Swope
Attorneys

2,703,767

TRANSPARENT ELECTRICALLY CONDUCTING UNIT

Thomas K. Young, Toledo, Ohio, assignor to Libbey-Owens-Ford Glass Company, Toledo, Ohio, a corporation of Ohio Application May 21, 1951, Serial No. 227,366

7 Claims. (Cl. 117—211)

The present invention relates broadly to electrically conducting films, and more particularly to films of this character in which the resistivity of predetermined sections of the film is increased during the filming operation.

Although the invention is in no way restricted to electrically conducting films of any particular type or composition, or to their use with any particular kind of base or supporting surface, it has to date proven most valuable in connection with transparent, electrically conducting films of tin oxide on glass sheets, and it will be specifically described in that connection here.

Glass sheets coated with transparent, electrically conducting films of tin oxide, that are applied by exposing the glass sheet while at a temperature approximating the softening point of the glass to the action of a tin compound in fluid form, have come to be quite widely used in de-icing windows or windshields in aircraft and other automotive vehicles.

In use, the electrically conducting film on the glass sheet is supplied with sufficient electrical energy, through suitable electrodes secured to the glass and in electrical contact with the film, to heat the glazing unit to a temperature at which ice or frost will be removed therefrom, or its formation prevented on the surface of the exposed face of the unit.

With de-icing glazing units of this character, electrodes are provided which extend along the length of the marginal portions that are adjacent two opposite edges of the filmed glass sheet, and with uniformly filmed glass sheets of rectangular shape wherein the corners form substantially a right angle, this arrangement gives a uniform temperature throughout the area of the film upon the application of the required amount of electrical energy to the electrodes.

However, when uniformly filmed glass sheets of substantially rectangular design, but having rounded or beveled corners, are supplied with electrical energy, through electrodes arranged in the same way on the sheets, objectionably non-uniform heating of the unit and the presence of "hot spots" at the ends of the electrodes result. Thus, when the electrodes are positioned along the length of the marginal portions of the filmed sheet, but not extending around the rounded or beveled corners thereof, the area of the film at opposite ends of the sheet and beyond the tips of the electrodes will not be directly heated. In other words, in lights having rounded corners and electrodes located with their ends not arranged completely around the rounded corners, there is an area of the film which is not bordered by the electrodes and hence will not receive the same amount of current as the remainder of the film. Prior hereto, this area extending outwardly of the electrode tips was heated principally by conduction and inadequate heating thereof was the inevitable result.

Attempts to remedy this situation by extending the electrodes over or around the rounded or beveled corners and uniformly filming the sheet throughout its entire area produced what are known in the art as "hot spots" or points of greater heat concentration. Thus, when the electrodes are arranged along the length of the marginal portions of the filmed glass sheet and extended around the upper and lower corners of the sheet, the ends of the electrodes are relatively closer to each other than the other portions of the current carrying means.

Since it is known that heat is a function of current squared times resistance ($I^2R$), when an equal amount of current is supplied to all portions of the electrodes, the current will seek the path of least resistance. In a uniformly filmed glass sheet having electrodes extending along the corners of the filmed surface of the sheet, this path is between the tips of the electrodes where the distance is the least. Therefore, when current is supplied to electrodes which are rounded at their ends, or to electrodes one of which is longer than the other, or in any situation when the end portions of the electrodes are closer than the remainder of the electrodes, a greater amount of current will travel over this path of least resistance and a correspondingly larger amount of heat energy will be created at the ends of the electrodes, resulting in the development of the "hot spots" above mentioned.

As is apparent, the presence of points or areas of relatively greater heat concentration is extremely objectionable, particularly in aircraft glazings. First, a reduction in current input to the electrodes, in order to eliminate the hot spots, will not provide a sufficient amount of heat energy to the remainder of the unit whereby frost will be removed from, or its formation prevented on, the surface of the exposed face of the unit. Secondly, when the filmed glass sheet is combined with a plastic interlayer to form a laminated unit, as is usually the case with aircraft glazing, hot spots at the ends of the electrodes frequently cause overheating or bubbling of the plastic interlayer, seriously interfere with the normal stability of the lamination, and may eventually be the cause of failure of the unit.

It is therefore an object of this invention to attain uniformity of temperature throughout the area of an electrically conducting film upon an irregular shaped glass base by controlling the current flow in the film.

Another object of the invention is to compensate for temperature differentials in an electrically conducting film due to the relatively closer proximity of certain portions of the electrodes to one another than other portions thereof by varying the current carrying properties of predetermined portions of the filmed area.

Another object of the invention is to provide an electrically conducting film on a surface of substantially rectangular shape but having rounded or beveled corners which reduce the width of the surface, that will effect uniform heating of the conducting film upon the application of current thereto, by diminishing the thickness of the film in the reduced area of said surface adjacent and between the ends of the current carrying means.

A further object of the invention is the provision of a transparent electrically conducting unit of irregular shape that will heat uniformly upon the application of electrical current to the film, which unit includes a sheet of glass having rounded or beveled corners, a pair of electrodes along two opposite margins and extending around said corners, and a transparent electrically conducting film on the same surface as the electrodes and of relatively lesser thickness adjacent and between the ends of the electrodes.

Other objects and advantages of the invention will become more apparent during the course of the following description when taken in connection with the accompanying drawings.

In the drawings, wherein like numerals are employed to designate like parts throughout the same:

Fig. 1 is a face view of a finished substantially rectangular sheet of glass that has been filmed according to the invention;

Fig. 2 is a vertical sectional view through a heating furnace which may be used to heat the glass sheet prior to filming and/or to fire the electrodes onto the glass;

Fig. 3 is an end view of a spraying and cooling apparatus for applying the filming material to the heated glass;

Fig. 4 is a front view of an apparatus for cooling the heated glass sheet prior to the filming thereof; and Fig. 5 is a sectional detail view of the glass sheet filmed in accordance with the invention.

Referring now more particularly to the drawings, there is shown a sheet or plate of glass 7 of a substantially rectangular shape having two parallel sides 8 and 9 and two non-parallel or arched ends 10 and 11. It will be noted that the sheet has two pairs of rounded corners 12 and 13, although either one or both of these pairs of corners may be beveled.

As has been indicated above, when such a glass sheet is filmed in the usual manner to produce an electrically conducting film of uniform thickness, it will be found upon the application of electrical current to the film through electrodes 14 and 15 positioned along the parallel margins and extending for a short distance around the pairs of rounded corners 12 and 13, a relatively greater amount of heat will concentrate adjacent and between the ends of the electrodes 14 and 15, resulting in the formation of hot spots at these locations and eventual reduction, if not destruction, of the efficiency of the unit.

According to the present invention, however, I have discovered that these areas or points of greater heat concentration may be eliminated by reducing the thickness of the film adjacent and between the end portions or tips of the electrodes whereby the electrical resistance at such areas or points is maintained at a high level and less current travels therethrough. Broadly speaking, this is accomplished by cooling the tips of the electrodes and a band of the glass extending therebetween so that said tips and band will not be filmed to the same extent as the remainder of the glass sheet.

The electrodes 14 and 15 may be of any one of different materials which can be applied in a manner well-known in the art. For example, electrodes of sprayed copper, sprayed copper alloys, baked on gold, silver and platinum fluxes, and combinations of these materials have all been used satisfactorily.

Similarly, as indicated above, the invention may be practiced in connection with various types of electrically conducting coatings, and various procedures can be followed to produce a film having one or more portions of reduced thickness. However, for the purpose of illustration, a preferred method of producing a transparent, electrically conducting film of tin oxide, of varying thickness, on a substantially rectangular glass sheet having rounded or beveled corners has been illustrated in the drawings.

Thus, a glass sheet 16 to which electrodes 14 and 15 have been applied is first suspended, by means of tongs 17, from a carriage 18 running along a monorail 19. The carriage 18 is then moved along the rail 19 to a position within a suitable tunnel type heating furnace A wherein the glass sheet 16 is heated to substantially the point of softening of the glass.

The furnace A, which comprises top and bottom walls 20 and 21 and side walls 22 and 23, may be heated in any suitable manner, such as by ribbon type resistance heating units 24 shielded by heat distributing and equalizing plates 25.

Upon reaching substantially the point of softening of the glass, the sheet is ready for the application of the conducting film and so the carriage 18 is moved further along the monorail 19 to bring the heated sheet 16 out of the furnace and into the filming position as shown in Fig. 3.

An electrically conducting coating of tin oxide may be applied to a hot glass sheet in a number of different ways and by the chemical action of any one of a variety of different tin compounds. However, in actual commercial production it is preferred to apply it by spraying the heated glass with an alcohol solution of a tin halide, and specifically a 10% solution of stannic tetrachloride in isopropyl alcohol. This may be done by the use of suitable filming apparatus B which comprises spray guns 26, adjustably mounted on a post 27 that is supported from a carriage 28 mounted on wheels 29 which run on tracks 30. The number of spray guns used will depend on the vertical dimension of the sheet 16 to be sprayed and on the area that can be covered by each gun, it being preferred that, with the guns arranged as shown and each emitting an equal volume of spray per minute, the sheet 16 will receive a substantially uniform coating of spray material from top to bottom.

In order to insure a uniform thickness of coating from side to side of the sheet, the carriage 28 is preferably reciprocated back and forth on the tracks 30 during the spraying cycle. However, as has been explained above, when a sheet 16 of substantially rectangular shape, but having rounded or beveled corners, is provided with an electrically conducting film that is of uniform thickness from top to bottom of the sheet, and current is applied to the film through the electrodes 14 and 15, a relatively greater amount of heat will concentrate adjacent and between the ends of the curved electrodes and hot spots will develop.

This invention provides a practical solution of the above difficulty by directing a spray of cooling fluid, such as air, onto the tips of the electrodes and onto a band of glass between said end portions prior to the filming operation.

Thus, there is herein provided, as may be seen in Figs. 3 and 4, cooling means C positioned substantially in front of the spray guns 26 and in the path of the sheet 16 as it travels forwardly from the furnace A by means of the carriage 28. This means C comprises a plurality of pieces of hollow pipe 31 joined together by elbow joints 32 and arranged to form a substantially rectangular framework 33 corresponding in general to the shape of the sheet 16, although of a somewhat larger outline. Directed inwardly from the framework 33 and joined integrally thereto by means of couplings 34 are two pairs of relatively thin tubes 35 and 36. The upper pair of tubes 35 are arranged slightly downwardly of the upper portion of the framework 33 and each tube of the pair is provided with an upwardly and angularly inwardly directed section 37 positioned to emit a flow of cooling fluid onto the end portions of the electrodes and also onto a portion of the sheet extending between said end portions. Similarly, the lower pair of tubes 36 are arranged upwardly of the lower portion of the framework 33 and each tube of the pair has a downwardly and angularly inwardly directed section 38 also designed to cause the cooling fluid to flow across the electrode tips and onto the glass therebetween. The pieces of hollow pipe 31 forming the framework 33 may be further joined by a T-joint 39 which may be connected to a suitable source of air (not shown) by additional tubing 40.

The rectangular framework 33 may be suitably attached to a conventional mounting frame or may be secured, as shown in Fig. 3, to cooling apparatus of the type disclosed in the copending application of Romey A. Gaiser, Serial No. 126,521, filed November 10, 1949. As disclosed therein, a glass sheet is heated to substantially the point of softening of the glass, a tin halide directed in fluid form against one surface of the hot sheet, and substantially simultaneously the opposite surface of the sheet is chilled by moving air directed thereagainst. By so treating the filmed glass sheet there is provided a product which will exhibit mechanical strength and breaking characteristics under predetermined pressure loads that are substantially the equivalent of those of tempered glass. It will be appreciated, however, that the present invention is of equal application whether or not it is combined with the cooling apparatus disclosed in the above-noted copending application.

Thus, when it is desired to operate the cooling means C herein disclosed together with the apparatus of the above said application, the rectangular framework 33 may be arranged around and suitably secured to a hollow sheet metal casing 41 through which the blasts of air are directed at the unfilmed surface of the heated sheet 16, in accordance with the method of said application. The casing 41 may be attached to any suitable mounting means, such as by flanges 42.

In the practice of the present invention, after the glass sheet 16 has reached substantially its point of softening within the furnace A, it is directed forwardly therefrom by means of the carriage 18 and positioned in front of the filming apparatus B and cooling means C whereby the heated sheet 16 is suspended substantially centrally of the framework 33. In this position, the upwardly directed sections 37 of the pair of tubes 35 and downwardly directed sections 38 of the pair of tubes 36 are angularly arranged to distribute a stream of air not only upon the curved ends of the electrodes 14 and 15, but also across an area of the glass sheet extending outwardly of the phantom lines indicated in Figs. 1 and 4.

Upon reaching the position above indicated, the glass sheet 16, and specifically the ends of the electrodes and areas $a$ and $b$ bounded by the phantom lines, are subjected to streams of air for a period of approximately 25 seconds, the air supply is shut off, and the coating solution is caused to be sprayed onto the entire surface of the sheet from the guns 23. It will be apparent that although it is suggested that the streams of air be directed against the selected portions of the sheet for approximately 25 seconds, this is merely by way of practical example and that conditions, such as for example, the thickness of the sheet, may dictate an increase or decrease in the cooling time set forth.

Thus, the areas $a$ and $b$ of the glass sheet and ends of the electrodes 14 and 15 are cooled prior to the deposition of the tin halide solution thereon to lower the temperature of these areas, render said predetermined portions relatively less receptive to a uniform film of tin oxide, and thus reduce the amount of deposit thereon. This is so because an effective and uniform film of tin oxide can best be deposited upon a glass surface which is at substantially its point of softening, and thus, when the temperature of the surface is reduced, a relatively lesser amount of film 43 will be deposited thereon, substantially as shown in Fig. 5. Thus, as illustrated, the film 43 is of gradual diminishing or decreasing thickness outwardly from the phantom lines shown in Fig. 1 to the ends of the glass sheet 16 in direct proportion to the convergency of the end portions of the electrodes 14 and 15.

By the method annd means above disclosed the resistivity of the electrically conducting film 43 on the end portions of the electrodes, and in the areas $a$ and $b$ of the glass sheet 16, is at a higher level than the remainder of the filmed sheet, the reason for this being since these areas have a relatively thinner film of tin oxide than other areas of the sheet, the resistances of said areas $a$ and $b$ are increased. Therefore, in these areas, which lie between the rounded tips of the electrodes 14 and 15, a relatively lesser amount of current will flow across this path of relatively higher resistance, a lesser amount of heat energy will be developed in these areas and at the electrode tips, and consequently, hot spots and areas of relatively greater heat concentration will be substantially eliminated.

It will thus be seen that there is herein disclosed a method of producing an electrically conducting coating upon a surface of a glass sheet of irregular outline, comprising uniformly heating the sheet to substantially the point of softening of the sheet, and finally applying a coating of tin oxide to the surface of said sheet including the cooled areas.

Although the drawings indicate the application of the invention to a glass sheet having parallel sides and rounded corners, it will be appreciated that it can also be employed to vary the resistivity of predetermined portions of a filmed glass sheet having parallel or non-parallel sides and ends and beveled corners joining the respective sides and ends. In such an application, wherein the electrodes extend along the length of the marginal portions and upwardly or downwardly around the beveled portions to the ends of the sheet, the procedure is the same. That is, air blasts are directed over the electrode tips, and a band of glass extending between said tips, to cause the deposition of a relatively lesser amount of film in these areas, thereby increasing the resistivity, and with a uniform amount of currrent input to the entire electrodes, resulting in the development of a lesser amount of heat in said areas annd consequent elimination of the hot spots heretofore productive of failures in units of the type above described.

It is to be understood that the form of the invention herewith shown and described is to be taken as a preferred embodiment of the same, but that various changes in the shape, size and arrangement of parts may be resorted to without departing from the spirit of the invention or the scope of the subjoined claims.

I claim:

1. The method of producing an electrically conducting coating upon a surface of a glass sheet of irregular outline, comprising uniformly heating the sheet to substantially the point of softening of the glass, then cooling preselected portions only of the sheet, and finally substantially uniformly applying a coating of tin oxide from a tin halide solution to the surface of said sheet including the cooled areas.

2. The method of producing an electrically conducting coating upon a surface of a glass sheet of irregular outline, comprising uniformly heating the sheet to substantially the point of softening of the glass, cooling preselected portions only of the sheet, substantially uniformly applying a coating of tin oxide from a tin halide solution to the surface of said sheet including the cooled areas, and projecting cold air upon the opposite surface of the sheet simultaneously with the application of the tin oxide coating.

3. The method of producing an electrically conducting coating upon a surface of a glass sheet of irregular outline, comprising uniformly heating the sheet to substantially the point of softening of the glass, then cooling preselected portions only of the sheet by the application of jets of air thereto, and finally substantially uniformly spraying a solution of tin halide to the surface of said sheet including the cooled areas.

4. The method of producing an electrically conducting coating upon a surface of a glass sheet of irregular outline, comprising uniformly heating the sheet to substantially the point of softening of the glass, cooling preselected portions only of the sheet by the application of jets of air thereto, substantially uniformly spraying a solution of tin halide to the surface of said sheet including the cooled areas, and projecting jets of cold air upon the opposite surface of the sheet simultaneously with the spraying of the tin halide solution.

5. The method of producing a transparent electrically conducting unit having predetermined areas of increased resistivity, comprising applying a pair of electrodes along opposite marginal edges of a surface of a glass sheet with certain portions of the electrodes being closer together than other portions thereof, uniformly heating the sheet to substantially the softening point of the glass, cooling the areas of the sheet between the more closely arranged portions of the electrodes, and applying a coating of a transparent electrically conducting film to the entire surface of the sheet.

6. The method of producing a transparent electrically conducting unit having predetermined areas of increased resistivity, comprising applying a pair of electrodes along opposite marginal edges of a surface of a glass sheet, with the end portions of the electrodes being closer together than the remaining portions thereof, uniformly heating the sheet to substantially the softening point of the glass, cooling the end portions of the electrodes and the areas of the sheet between said end portions, and immediately thereafter uniformly applying a coating of a transparent electrically conducting film to the entire surface of the heated glass sheet.

7. The method of producing a transparent electrically conducting unit having predetermined areas of increased resistivity, comprising applying a pair of electrodes along opposite marginal edges of a surface of a glass sheet, with the end portions of the electrodes being closer together than the remaining portions thereof, uniformly heating the sheet to substantially the softening point of the glass, reducing the temperature of the end portions of the electrodes and the areas of the sheet between said end portions by the application of a cooling fluid thereto, terminating the flow of cooling fluid, uniformly spraying a coating of a solution of tin halide to the entire surface of the sheet while heated, and simultaneously chilling the opposite surface of the sheet by directing moving air thereagainst.

References Cited in the file of this patent

UNITED STATES PATENTS

| | | |
|---|---|---|
| 2,330,202 | Brennen | Sept. 28, 1943 |
| 2,429,420 | McMasters | Oct. 21, 1947 |
| 2,478,817 | Gaiser | Aug. 9, 1949 |
| 2,522,531 | Mochel | Sept. 19, 1950 |
| 2,569,773 | Orr | Oct. 2, 1951 |
| 2,570,245 | Junge | Oct. 9, 1951 |